United States Patent [19]

Barnett et al.

[11] Patent Number: 4,653,100

[45] Date of Patent: Mar. 24, 1987

[54] AUDIO RESPONSE TERMINAL FOR USE WITH DATA PROCESSING SYSTEMS

[75] Inventors: Christopher J. Barnett, Little Silver, N.J.; Mark P. Dyche, Chandler's Ford, England; Victor G. Golding, Ower, England; Yat H. Ng, Cuppernham, England

[73] Assignee: International Business Machines Corporation, Armonk, N.Y.

[21] Appl. No.: 460,701

[22] Filed: Jan. 24, 1983

[30] Foreign Application Priority Data

Jan. 29, 1982 [EP] European Pat. Off. ........ 82300484.1

[51] Int. Cl.⁴ .............................................. G10L 1/00
[52] U.S. Cl. ...................................... 381/52; 364/513
[58] Field of Search ..... 364/513, 513.5, 200 MS File, 364/900 MS File; 381/51, 52, 53, 36, 37, 38, 39, 40; 340/709, 721; 434/157, 313

[56] References Cited

U.S. PATENT DOCUMENTS

| | | | |
|---|---|---|---|
| 4,163,120 | 7/1979 | Baumwolspiner | 364/513 |
| 4,328,562 | 3/1982 | Hashimoto et al. | 381/51 |
| 4,418,412 | 11/1983 | Kariya | 381/51 |
| 4,423,290 | 12/1983 | Yoshida et al. | 381/51 |
| 4,454,608 | 6/1984 | Maeba | 381/51 |
| 4,579,533 | 4/1986 | Anderson et al. | 434/157 |

FOREIGN PATENT DOCUMENTS 2909154 9/1980 Fed. Rep. of Germany.

OTHER PUBLICATIONS

Design News-μC-Based Key to Speech Synthesizer gives stroke victims a voice, EDN Feb. 20, 1978, vol. 23, No. 4.

W. K. Foster et al., Audio Review of Text, IBM Technical Disclosure Bulletin, vol. 23, No. 1, Jun. 1980, pp. 35-37.

Primary Examiner—Gareth D. Shaw
Assistant Examiner—Martin Yuen
Attorney, Agent, or Firm—Karl O. Hesse

[57] ABSTRACT

An audio response terminal for a data processing system which provides an audio output for data that is displayed on a video display unit. The terminal has a control unit that is separate from the display controls, but receives inputs from the display buffer and a separate key pad. The control unit gives the user the ability to specify which rows or columns of a screen of data are to be spoken and also four modes of speech, spell, phonetic spell, speak with punctuation or plain speech.

A microprocessor using a translator examines each alphanumeric character and provides a string of digitized phonemes which drive a speech synthesizer. The speech synthesizer provides an audio output signal to a loudspeaker or headphone socket.

3 Claims, 6 Drawing Figures

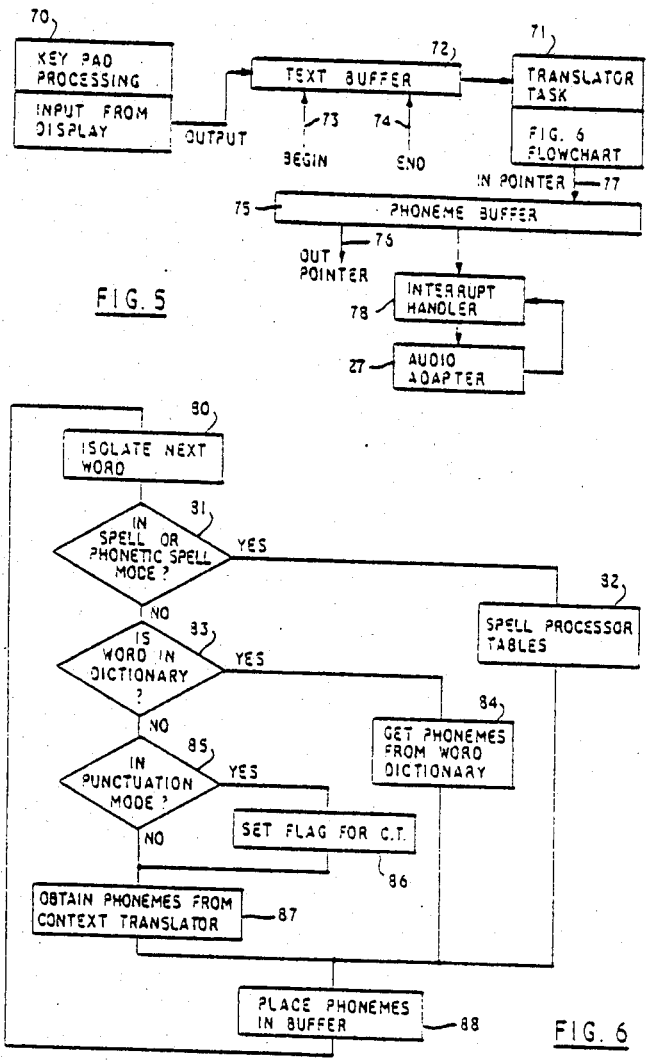

AUDIO RESPONSE TERMINAL FOR USE WITH DATA PROCESSING SYSTEMS

This invention relates particularly to audio response terminals for use with data processing systems. Such terminals may also include visual display units (v.d.u.) and other data output devices, however such v.d.u.'s and output devices are not essential to the invention.

BACKGROUND OF THE INVENTION

The use of input/output terminals to communicate interactively with a data processing system is now becoming commonplace. At present most communication takes place through a v.d.u. such as the IBM 3278 data display terminal (IBM is a Registered Trade Mark) which has a keyboard for the operator to enter information and a cathode ray tube (c.r.t.) on which both the entered information and the data processor's response are displayed.

In many applications, however, the operator does not look at the c.r.t. screen continuously, such as when entering a continuous text stream, or when an associated manufacturing operation only requires messages to be infrequently displayed on the screen. Blind or partially sighted operators or users of the system also do not find the need to use the screen for an indication of output messages helpful.

The present invention is directed towards providing a terminal device for a data processing system which provides an audio output for information entered into and messages received from the data processing system.

The terminal may be a pure audio response unit, or the audio response unit may be combined with a v.d.u. or any other data output device.

Devices are known in which audio responses are made to operator's specific requests. These have until now been of the type in which a large dictionary of words or syllables is recorded on an audio recording medium such as magnetic tape or digitally on a disc and the data processor constructs an audio response by selecting the appropriate words or syllables and concatenating them. There is an inherent limitation in this approach as any response may only use what has already been recorded and new words and combinations cannot be used. The system also has a large storage requirement which is an unacceptable overhead.

The present invention makes use of a phoneme-based speech synthesizer such as that described in published Great Britain Patent Application 2,077,558 (Federal Screw Works). This patent application describes a phoneme-based speech synthesizer that is particularly adapted for implementation on a single integrated circuit chip includes a vocal tract model comprised of a fixed resonant filter and a plurality of tunable resonant filters whose resonant frequencies are controlled in accordance with the values of certain control parameters. A digital transition circuit is included which gradually transitions the values of the vocal tract control parameters as they change from phoneme to phoneme by iteratively adding to the current values a predetermined percentage of the difference between the current and target values. The vocal tract model is implemented utilizing a capacitive switching technique which eliminates the need for large valued components to achieve the relatively low frequencies of human speech. A glottal source generator is adapted digitally to generate a glottal pulse signal in a manner which readily permits the glottal pulse to be spectrally shaped in any desired configuration.

BRIEF SUMMARY OF INVENTION

According to the invention there is provided an audio response unit for use with a data processing system which includes a data buffer in which output data is stored characterised in that the audio response unit includes selector means to select data from the data buffer, translator means to translate the selected data into a string of digitised phoneme signals, a voice synthesizer for converting the digitized phoneme signals into audio output signals and means to connect the audio output signals to an audio output device.

INTRODUCTION TO THE DRAWINGS

In order that the invention may be fully understood it will now be described, by way of example, with reference to the accompanying drawings in which:

FIG. 5 illustrates the main operation of the microprocessor of FIG. 2;

FIG. 6 is a flow diagram of translate task of FIG. 5.

DETAILED DESCRIPTION

In the preferred embodiment of the invention a visual display unit is connected through a data buffer to a data processing system. The data processing system may be a remote computing system connected to the display unit over a telecommunication link, it may be a microprocessor included in the same cabinet as the display or any other type of processor connected directly or remotely.

Figure 1:
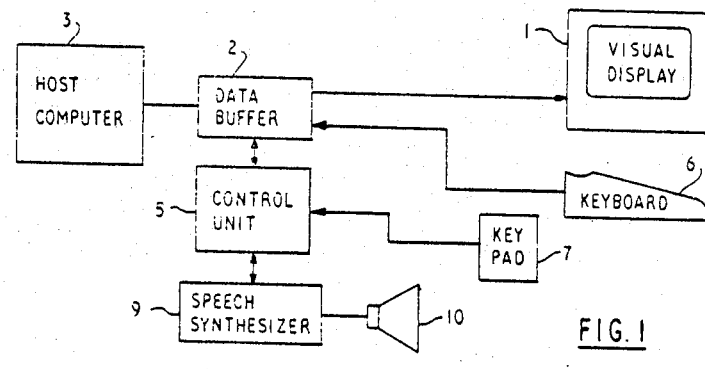
FIG. 1 is a block schematic diagram of a preferred embodiment of the invention.

FIG. 1 shows a block schematic of such a general system. The visual display unit 1 is connected to a data buffer 2, this in a v.d.u. is the refresh buffer and stores the characters to be displayed on the screen of the v.d.u. 1. A processing unit 3 is connected to the data buffer 2. An auxiliary processing unit (control unit) 5 provides the control function for the audio response unit. The control unit 5 is connected to the data buffer 2, and receives an input from an input keyboard 6 and a set of mode keys 7.

A speech synthesizer 9, similar to that described in published United Kingdom Patent Application No. 2,077,558 above, is connected to receive inputs from the control unit 5. An audio signal output from the speech synthesizer 9 is connected to an audio output device 10, which may be a loudspeaker or a set of headphones. In the preferred embodiment a loudspeaker and a headphone socket are provided and arranged so that insertion of a headphone jack plug into the socket isolates the loudspeaker.

Figure 2:
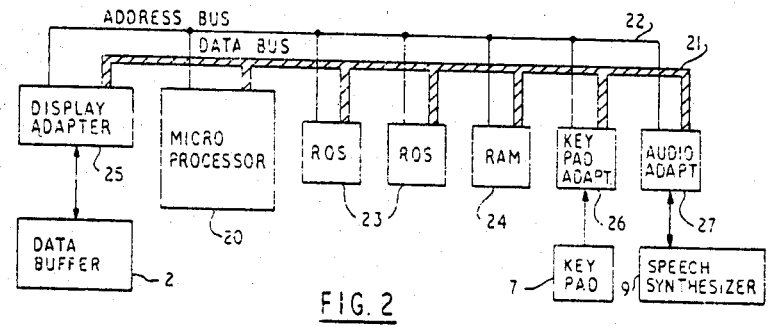
FIG. 2 is a block schematic of the control unit shown in FIG. 1.

Referring now to FIG. 2 in which the control unit 5 of FIG. 1 is shown in more detail. The control unit comprises a microprocessor 20 which is connected to a data bus 21 and an address bus 22. Microcode for controlling the operation of the control unit is stored in read only stores 23 and a working random access store 24 is also connected to the data and address buses. In the preferred embodiment the components 20, 23 and 24 are mounted on one component card.

A display adapter 25 is also connected to the data bus 21 and address bus 22 and to the data buffer 2 (FIG. 1). Keypad adapter 26 is connected to the keypad 7 and an audio adapter 27 is connected to the speech synthesizer 9. Both the keypad adapter 26 and the audio adapter 27 are connected to the data bus 21 and the address bus 22.

Figure 3:
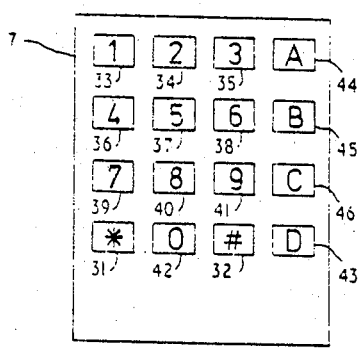
FIG. 3 is a schematic diagram of the key pad unit shown in FIG. 1.

The keypad 7 is illustrated schematically in FIG. 3. There are sixteen keys divided into two speaking format keys 31 and 32, ten numeric keys (33–42) and four special function keys 43, 44, 45 and 46.

In operation there are four speaking formats. Selection of a format is made by depression of one of the keys 31 or 32. Depression of key 31 changes from PRONOUNCE to SPELL or vice versa, depression of key 32 alternates between PUNCTUATE and PHONETIC SPELL. Depression of key 31 returns to PRONOUNCE from either PUNCTUATE or PHONETIC SPELL. The name of the new format is announced after each depression of either of these two keys.

Pronounce Format—The contents of the screen are spoken in the same way as a book is read, spaces and punctuation marks are not announced. Each word is stripped of trailing blanks and if it contains a vowel and not characters repeated continuously three or more times an attempt is made to pronounce it. Otherwise it is spelled. No distinction is made between upper and lower case letters.

A number composed of more than one figure has each figure separately identified—132 is not pronounced "one hundred and thirty two" but one, three, two".

If a character is repeated three or more times the character is announced once preceded by a unique sound and a count of the number of times it appears. The unique sound denotes that the following count has been computed from the text data rather than repeating the speaking of the characters many times.

Punctuate Format—The contents of the screen are spoken as in pronounce format but in addition spaces are each identified by a sound, new lines by a different sound, the number of spaces is given if repeated three or more times, initial capital is identified and punctuation marks are pronounced. No differentiation is made between spaces and nulls. An initial capital will be identified, and a non-initial capital will force the word to be spelled.

Spell Format—All words are spelled, spaces and capitals are identified, numbers of repeated spaces or characters are given and punctuation marks are pronounced.

Phonetic Spell Format—To dispel confusion in cases of similar sounding letters (e.g. "v" and "b"), it is possible to select spelling using an international phonetic alphabet.

Speaking is done with reference either to the display unit cursor or to an internal pointer. In the second case the cursor remains stationary and the user reads off the screen by moving the pointer. At power-on the user is in cursor mode and pronounce format. A change to pointer mode is achieved by depressing key 43 followed by two numeric keys (33–42) denoting a row number on the display (01 to 24). The pointer is positioned at the beginning of the row, the row number is announced ("Row xx") and speaking of the row commences. Depression of key 43 followed by key 41 returns to cursor mode.

Cursor Mode—When in cursor mode screen data is selected for speaking by positioning the cursor with the normal cursor control keys on the display keyboard and selecting what is to be spoken with the keypad. Characters, words or rows referenced by the cursor are then spoken. The cursor points to a word when it is under any character of the word.

The functions associated with each key on the keypad when in cursor mode and in PRONOUNCE format is described below. When in SPELL or PHONETIC SPELL formats everything is spelled. In PUNCTUATE format everything is spoken as in PRONOUNCE with the additional information added as described above.

Speaking can be stopped at any time by depression of the (stop) key 41. Depression of the appropriate key as described below initiates further output. The current function is also terminated when another function is requested.

Key 33—The word before the one where the cursor is located is spoken. If the cursor is at the first word in the row the phrase "first word" is heard.

Key 34—The word where the cursor is located is spoken.

Key 35—The word after the one where the cursor is located is spoken. If the cursor is at the last word in the row the phrase "last word" is heard.

Key 36—The row before the one in which the cursor is located is spoken. If the cursor is located in the first row the phrase "first row" is heard.

Key 37—The row in which the cursor is located is spoken.

Key 38—The row after the one in which the cursor is located is spoken. If the cursor is located in the last row the phrase "last row" is heard.

Key 39—The character at the cursor is spoken. If it is an alpha character the phonetic equivalent is spoken.

Key 40—The position of the cursor—"row xx, column YY" is announced.

Key 41—The STOP speaking key.

Key 42—Regardless of the cursor position speaking starts at the top of the screen and continues to the end of the screen. N.B. There is no 'resume speaking' in cursor mode.

Keys 44, 45 and 46 can be used at any time. Their functions are described later.

Pointer Mode—Depression of the key 43 changes from Cursor to Pointer mode. This must be followed by two digits (01 to 24) denoting row number. The pointer is positioned at the first character of the row selected, the row number is announced—"row xx" and speaking of the row starts. As each word is spoken the pointer is moved under that word. Thus if speaking is stopped and restarted the word being spoken or spelled is repeated.

The key functions associated with each key in pointer mode are as follows.

Key 33—The pointer is moved back along the row to the first character of the preceding word and that word is spoken. This key may be depressed a number of times in succession: the pointer steps back along the row one word for each depression. If the pointer is at the first word in the row the pointer is not moved and the phrase "first word" is spoken on the next key depression.

Key 34—The word where the pointer is located is spoken. The pointer is not moved.

Key 35—The pointer is moved along the row to the first character of the next word and that word is spoken. The key may be pressed a number of times in succession when the last word is reached "LAST WORD" is spoken.

Key 36—The pointer is moved back up the screen one row and positioned at the first character of that row, the row number is announced "row xx" and speaking of the row starts. The key may be pressed a number of times in succession: with each depression the pointer moves back up the screen one row. If the pointer is at the first row it does not move when this key is depressed and the phrase "first row" is announced.

Key 37—The row containing the pointer is spoken preceded by an announcement of the row number. As the row is spoken the pointer is moved along the row so that it is positioned under the next word as it is spoken.

Key 38—The pointer is moved down the screen one row, the row number is announced ("row xx") and speaking of the row starts. The key may be depressed a number of times successively: with each depression the pointer moves down the screen one row. If the pointer is at the last row it does not move when this key is depressed and the phrase "last row" is announced.

Key 39—The pointer position is announced ("pointer row xx, column YY"). If depressed during speaking, speaking stops before the position is announced. The pointer is at the word being spoken or spelled.

Key 40—The pointer moves to the cursor position and its position is announced ("row xx, column YY").

Key 41—Read out stops. The pointer is at the word being spoken or spelled.

Key 42—Reading is resumed at the position of the pointer and continues to the end of the screen.

Keys 44, 45 and 46 can be used at any time. Their functions are described below.

Keys 44, 45 and 46 provide special facilities which may be called at any time. If any other operation is in progress it is aborted when any of these keys is depressed.

Key 44—This key allows the user to select particular columns which are to be spoken. The remaining data on each row is ignored. Thus if there is a column of figures displayed on the screen the user can elect to have the figure down the column spoken without having to listen to the other data on each row. The user selects the zone to be spoken by depressing key 44 followed by two digits (01 to 80) denoting the first column and a further two digits (01 to 80) denoting the last column to be spoken. When this operation is complete the phrase "zone xxyy" is spoken to confirm the zone selection, the pointer is positioned at the first column selected on row 1 and the user is put into pointer mode. A return can be made to cursor mode by depressing the key 43 followed by key 41. In both types of mode the row now starts and finishes at the columns selected. If the cursor is outside the zone and key 34 is used the word "invalid" is spoken. If when key 33 or 35 is used it refers to a word outside the zone it also results in the word "invalid" being spoken. If it is desired to escape from the zone limitation and speak the total row depressing the key 44 followed by 9 (key 41) will cause a return to the full screen zone of 01 to 80.

At power-on the zone is 80 columns—the full length of the row.

Key 45—If the user wishes to determine status as displayed on the display indicator row (row 25) depression of key 45 will cause the contents of the row to be spoken. Symbols displayed are converted into meaningful phrases before being spoken.

Key 46—The position of highlighted fields can be determined by use of key 46 followed by key 33. If in cursor mode depression of key 46 followed by key 33 causes a search to be started at the beginning of the screen. If in pointer mode the search starts at the present pointer position. When a highlighted field is found the search is stopped, the pointer is located at the first character in the field and its position (highlight row xx, column yy) is announced. The user is now in pointer mode and speaking can be initiated by depressing the key 42. Further depressions of the key 46 followed by key 33 will cause a search for subsequent highlighted fields. The search wraps the screen. If no further highlighted field is found the original position is repeated. If there is no highlighted field on the screen the phrase "no highlight" is spoken.

If a return is made to cursor mode for operations in a highlighted field subsequent uses of key 46 followed by key 33 cause search to start at the beginning of the screen again and key 46 followed by key 33 is depressed as needed to skip the fields already spoken.

Data is transferred between the microprocessor 20 and the storage and adapter units on the data bus 21. The control unit employs memory mapped I/O. This is the technique of communicating with peripheral devices by reading or writing to them as though they were storage locations. The addresses assigned to them do not relate to physical storage, a read or write to them is intercepted by the adapter hardware. Using the hexidecimal notation then the hexadecimal addresses 4000 through 400D map to the peripheral devices as shown in the following table.

| ADDRESS READ/WRITE UNIT FUNCTIONS: | | | |
|---|---|---|---|
| ADDRESS | R/W | CARD | FUNCTION |
| 4000 | R | AUDIO ADAPTER | READ AND RESET PHONEME ADAPTER |
| 4000 | W | AUDIO ADAPTER | WRITE PHONEME DATA |
| 4002 | R | KEYPAD ADAPTERS | READ DATA AND RESET INTERRUPT |
| 4008 | R | DISPLAY ADAPTER | READ AND RESET DATA ROW BUFFER READY INTERRUPT |
| 4008 | W | DISPLAY ADAPTER | LOAD DATA ROW ADDRESS REGISTER |
| 4009 | R | DISPLAY ADAPTER | READ AND RESET INDICATOR ROW BUFFER CHANGED INTERRUPT |
| 400A | R | DISPLAY ADAPTER | READ DATA ROW BUFFER |
| 400B | R | DISPLAY ADAPTER | READ INDICATOR ROW BUFFER |
| 400C | R | DISPLAY ADAPTER | READ CURSOR ROW REGISTER |
| 400D | R | DISPLAY ADAPTER | READ CURSOR COLUMN REGISTER |

The unit is interrupt driven, that is whenever an adapter unit has a requirement to communicate with the processor then that unit generates an interrupt signal and the processor stops its current task to poll the adapters. The highest priority interrupt is that from the audio adapter, followed by the keypad adapter and then the data buffer.

Figure 4:
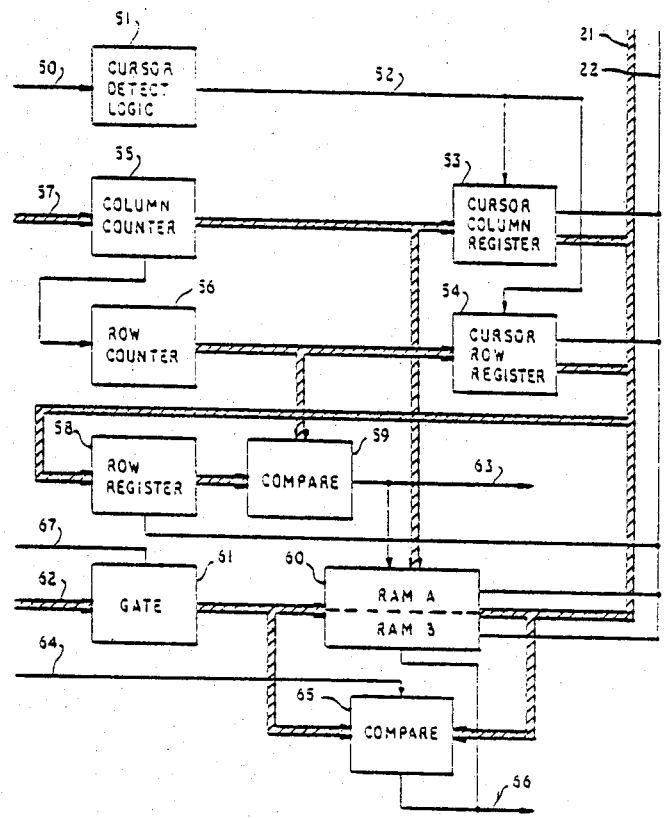
FIG. 4 is a schematic diagram of the display adapter shown in FIG. 2.

In operation, the data buffer 2 (FIG. 1) stores a full screen of 25 rows of characters, each row may include up to 8 scans through the buffer in synchronism with the electron beam scan of the display's cathode ray tube. The display adapter 25 (FIG. 2), shown in more detail in FIG. 4, receives five different inputs from the data buffer. On line 50 a cursor signal is up whenever the v.d.u. scan is generating the cursor on the screen. This signal is detected by cursor detect logic 51 which provides a load cursor register signal on line 52.

The cursor register has two parts, a cursor column register 53 and a cursor row register 54. These registers (53, 54) are loaded from a column counter 55 and a row counter 56.

The column and row counters (55, 56) are driven from an input on line 57 from the display buffer. This input is derived from the display counter and steps one for every character position scan by the v.d.u. The column counter is reset after every 80 characters which then steps the row counter on one on last scan line of each row. The row counter is reset after every 25th row.

When the cursor detect logic 51 indicates the presence of the cursor, then the current values of the column counter 55 and row counter 56 are loaded into the cursor column register 53 and cursor row register 54. Thus the cursor registers always contain the current address of the cursor position.

The cursor registers are connected to the address bus 22 (FIG. 2) and the data bus 21 (FIG. 2). As indicated above when the microprocessor issues a read command for the address 400C then the cursor row register is read and its data placed on the data bus, when a read for 400D is issued then the cursor column register is read.

A row register 58 also connected to the address bus 22 and data bus 21 receives an input from the microprocessor whenever the address 4008 is written to.

A compare unit 59 compares the contents of row register 58 with the value in the row counter 56 and when a match is made issues a load signal to a random access memory 60.

The random access memory 60 has two parts RAM-A and RAM-B. The input to the RAM 60 is through a gate 61 from the display buffer on line 62. The RAM-A part of the memory 60 stores a current row of data which is loaded when the compare unit 59 issues a load RAM signal on line 63. At the same time a signal is sent to the microprocessor on line 63 indicating that the RAM 60 is being loaded.

In the preferred embodiment the v.d.u. has an indicator row at the bottom of the screen on which messages indicating the state of the data processing system are displayed to the user. The user of the system does not necessarily want to be interrupted every time one of these messages occurs and the system is designed to only provide an audio indication of these messages in particular instances. An indicator row signal is received from the display on line 64 and sent to a compare unit 65. The current indicator row characters are stored in the RAM-B part of memory 60. Each time the display unit scans the indicator row the row stored in the RAM-B is compared with the current row received through gate 61. If there has been a change then the compare unit 59 issues a load RAM signal on line 66 and data stored in RAM-B is replaced by new data. An interrupt signal is generated on line 66 which is then sent to the microprocessor 20 (FIG. 2).

Some of the data entered into the v.d.u is not normally displayed, for example, pass-words and identity numbers. Obviously this data should not result in an audio output either and a non-display signal is received on line 67 to inhibit gate 61 whenever such data is scanned in the display buffer.

When an input from the key pad 7 indicates that the user wishes to have a particular row spoken then the microprocessor determines at which row the cursor is currently pointing and depending on whether it is that row, the preceding or succeeding row that the user requires so the microprocessor loads the required row number in the row register 58. When the compare unit 59 indicates that that particular row is being scanned by the v.d.u. the row of characters is loaded into RAM-A through gate 61 from the data on line 62. When the row is loaded into the register the microprocessor will issue a series of 80 read data row buffer instructions (4008) and will load the row of characters into the RAM 24 (FIG. 2).

FIG. 5 illustrates diagrammatically the two main tasks performed by the microprocessor 20. These tasks are a key pad processing task 70 and a translater task 71. In response to a particular combination of key pads inputs so the key pad processing task will obtain the required row of data characters from the data buffer 2 through the display adapter 25 and load it into a text buffer 72 contained in the RAM 24.

If a particular word in the row is to be spoken the key pad processing task will isolate the word with begin and end pointers 73 and 74 also stored in the RAM 24. The key processing task includes a series of sub-routines each associated with the key depressing commands listed above.

Thus when the user has indicated that the cursor mode is required and key 34 (FIG. 3) is then pressed, the key pad processing task will call a routine that determines the position of the cursor on the screen by reading the cursor row and column registers 53 (FIG. 4) it will then request that row of data from the display adapter, wait until it is available and then load the characters into the text buffer (72) and then place the begin and end pointers to point at the start and finish of the word associated with the cursor column. If key 35 is pressed then the key pad task will call a routine to establish the limits of the next word in the row and so forth.

When the key pad processing task has determined the word or words to be spoken, the translator task 71 starts its main operation which is to translate each word into a string of digitized phonemes which are then transmitted to the audio adapter 27 and on to the speech synthesizer 9. A flow chart of the translator's task 71 is shown in FIG. 6. The task is table driven, that is when a word or character string is identified, the task goes to an appropriate table to find the required phoneme string. The first table is a dictionary of common words that do not follow general pronunciation rules. Thus for example COUGH, BOUGH, PLOUGH and ROUGH, are stored with the appropriate phoneme strings. The second table is a direct roman alphabet and arabic numeral conversion to phonemes, which is required for the spell mode of operation.

The third table yields the phonetic equivalents to the alphabet, thus A=ALPHA B=BRAVO etc., for the phonetic spell mode. The fourth table is the set of rules for converting words not in the dictionary into phoneme strings to 'speak' the words naturally. This table is a universal contextual translator and the rules follow the example given in the article "Universal Contextual Translator" by P. W. Johnson and C. J. Lovell published in the IBM Technical Disclosure Bulletin, Vol. 23, No. 1, June 1980, pp. 38-40.

The flow of the translator task is first to isolate the next word to be translated (step 80) then at step 81 to determine whether the current mode is spell or spell phonetic. If this is the case then at step 82 the spell or phonetic spell processor tables are used to produce the phonemes for the current word. If the result of step 81 is negative then the task at step 83 determines whether or not the word is in the dictionary table. If this is positive then at step 84 the phonemes for the word are obtained from the word dictionary table. If the result of step 83 is negative then at step 85 the task determines whether or not the user has indicated punctuation mode. If yes then at step 86 a flag is set for the context translator to ensure that an audio response is generated for punctuation marks.

Step 87 follows both steps 85 and 86. This step is to use the universal contextual translator rules to generate the phonemes for the word being processed. When the phonemes are generated by any of steps 82, 84 or 87 they are placed in the phoneme buffer (75 FIG. 5) at step 88. Step 88 also determines whether or not there are further words to be processed, if this is the case step 80 is re-entered, if not then the task awaits a further input from the key pad processing task.

Phonemes are removed one by one from the phoneme buffer by an interrupt handler on request from the audio adapter which interrupts to request a new phoneme each time it has just passed one to the synthesizer card. Thus the processes of phoneme production and phoneme speaking are concurrent—the buffer allowing for slight variations in rates either way.

The micro maintains an IN pointer and an OUT pointer for the phoneme buffer. Thus if the rate of extraction (by audio adapter) ever exceeds the rate of supply by translator task a protection mechanism exists which detects that the OUT pointer=the IN pointer and a special null phoneme is sent to the audio adapter which causes it to stop requesting phonemes. Once a new supply has been built up by the translator task. The audio adapter is "woken up" and once again starts removing phonemes from the 'out' pointer.

The preferred embodiment of audio response unit described above has been designed particularly for the use of blind or partially sighted users. While having advantages for such operators, use of an audio response unit can be had in other areas, such as on a manufacturing line where a data processing system is used to monitor production steps and there is a need to provide an audio prompt to workers who would not be constantly watching a screen. The main technical advantage of the invention is the ability to translate the output signals of a data processing system into audio signals. The second technical advantage is the provision of the keypad to provide an operator with the ability to select data to be spoken and the mode of the speech.

What is claimed is:

1. An audio response unit for use with a display unit which is continually refreshed from a display buffer on a row by row basis, the improvement comprising:
    selector means to select a row of data stored in said display buffer and responsive to a change of data in said display buffer, said selector means including:
        a register to store an indication of the current cursor position,
        a comparison unit for comparing the cursor row position and
        the current row address of data being read from said display buffer to refresh said display unit,
        means to transfer a copy of said data into a random access store whenever the cursor row address and display refresh row address coincide;
        a second random access store into which a selected row of data is transferred and
        a second comparison unit to compare the selected row of data with the previously stored row of data and means to allow the transfer of data to said random access store only when the data has changed;
    translator means to translate the selected data into a string of digitized phoneme signals;
    a voice synthesizer for converting said digitized phoneme signals into audio output signals; and
    means to connect the audio output signals to an audio device.

2. An audio response unit as claimed in claim 1 in which said second random access store stores a row of message data and said selector means generates an output signal whenever the message data stored in said second random access store is different from that read from said display buffer.

3. An audio response unit as claimed in claim 2 including means to inhibit the output of data from said audio unit when such data is not normally output from said data buffer to said display.